(12) United States Patent
Ziv Av et al.

(10) Patent No.: US 12,204,331 B2
(45) Date of Patent: Jan. 21, 2025

(54) AIRCRAFT COLLISION AVOIDANCE SYSTEM

(71) Applicant: ZIV AV TECHNOLOGIES LTD., Ytzhak (IL)

(72) Inventors: Amir Ziv Av, Kiryat Ono (IL); Michael Bar-On, Givatayim (IL)

(73) Assignee: ZIV AV TECHNOLOGIES LTD., Be'erot Ytzhak (IL)

( * ) Notice: Subject to any disclaimer, the term of this patent is extended or adjusted under 35 U.S.C. 154(b) by 233 days.

(21) Appl. No.: 17/796,989

(22) PCT Filed: Jan. 30, 2021

(86) PCT No.: PCT/IL2021/050107
§ 371 (c)(1),
(2) Date: Aug. 2, 2022

(87) PCT Pub. No.: WO2021/156854
PCT Pub. Date: Aug. 12, 2021

(65) Prior Publication Data
US 2023/0053453 A1 Feb. 23, 2023

Related U.S. Application Data

(60) Provisional application No. 62/969,761, filed on Feb. 4, 2020.

(51) Int. Cl.
G05D 1/00 (2024.01)
G08G 5/04 (2006.01)
(52) U.S. Cl.
CPC ......... *G05D 1/0083* (2013.01); *G05D 1/0094* (2013.01); *G08G 5/045* (2013.01)
(58) Field of Classification Search
CPC .... G05D 1/0083; G05D 1/0094; G08G 5/045; G08G 5/065; H04W 4/023; H04W 4/80
See application file for complete search history.

(56) References Cited

U.S. PATENT DOCUMENTS

2011/0224845 A1* 9/2011 Perry ............... B64F 1/10
701/99
2015/0262492 A1* 9/2015 Barnes ............ G08G 5/065
701/301
(Continued)

FOREIGN PATENT DOCUMENTS

EP 2 947 638 A1 11/2015
WO 2006/027762 A1 3/2006
(Continued)

OTHER PUBLICATIONS

The Discovery Dispatch, Search Report, "A system and method for prevention air-craft collision while on the ground", Jan. 1, 2020, pp. 1-12.
(Continued)

*Primary Examiner* — Rodney A Butler
(74) *Attorney, Agent, or Firm* — Sughrue Mion, PLLC

(57) ABSTRACT

An apparatus for alerting an operator to the presence of obstacles during the towing or push-back of an aircraft while it is on the ground, including: a self-propelled platform; at least one sensor attached to said platform, configured to sense potential obstacles; and a communication system attached to said platform for transmitting data relating to said sensed obstacles, the communication system being operable to communicate with at least one of: a same said apparatus; an operator control panel; a command centre; the aircraft being towed or pushed-back; and a vehicle towing or pushing-back the aircraft. An aircraft collision avoidance system is used during towing or push-back of an aircraft while it is on the ground, the system includes: at least one apparatus as described; and a carrier configured to carry the at least one apparatus.

23 Claims, 8 Drawing Sheets

(56) References Cited

U.S. PATENT DOCUMENTS

2020/0013301 A1 1/2020 Vana et al.
2020/0180783 A1 6/2020 Cox et al.

FOREIGN PATENT DOCUMENTS

WO 2019/141850 A1 7/2019
WO 2020/028244 A1 2/2020

OTHER PUBLICATIONS

International Search Report for PCT/IL2021/050107 dated Apr. 30, 2021.
Written Opinion for PCT/IL2021/050107 dated Apr. 30, 2021.

* cited by examiner

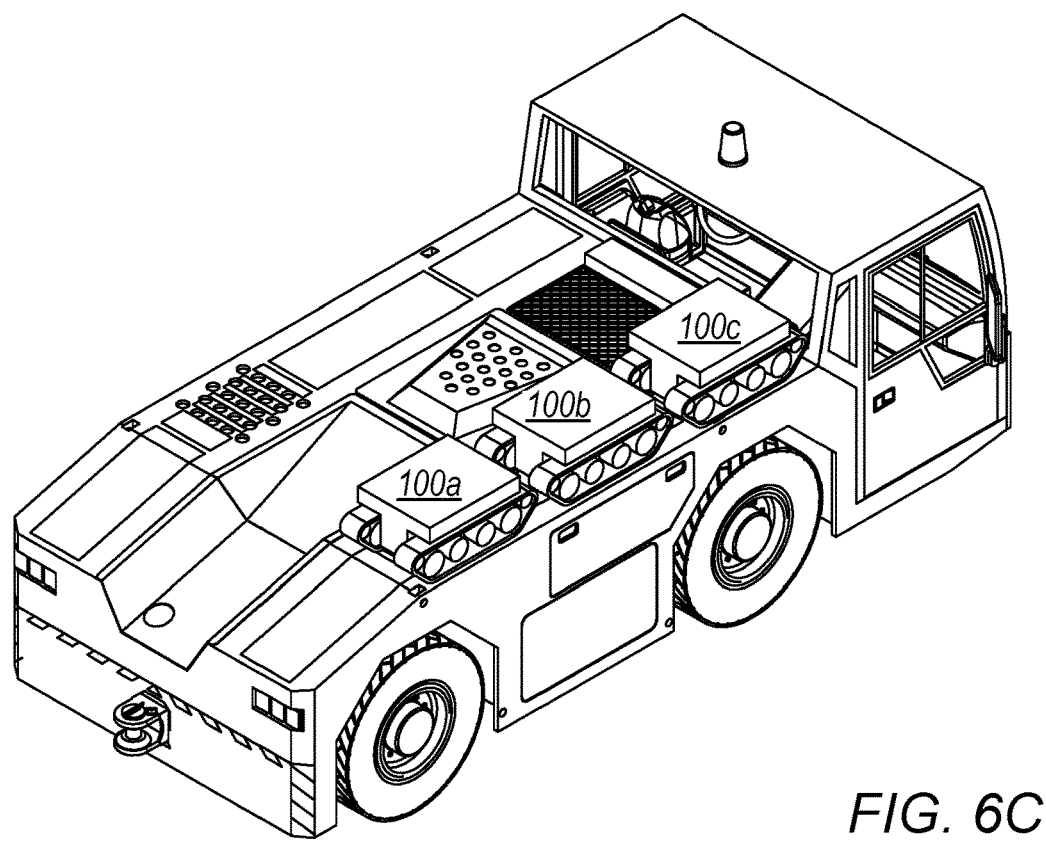
FIG. 6C
FIG. 6D
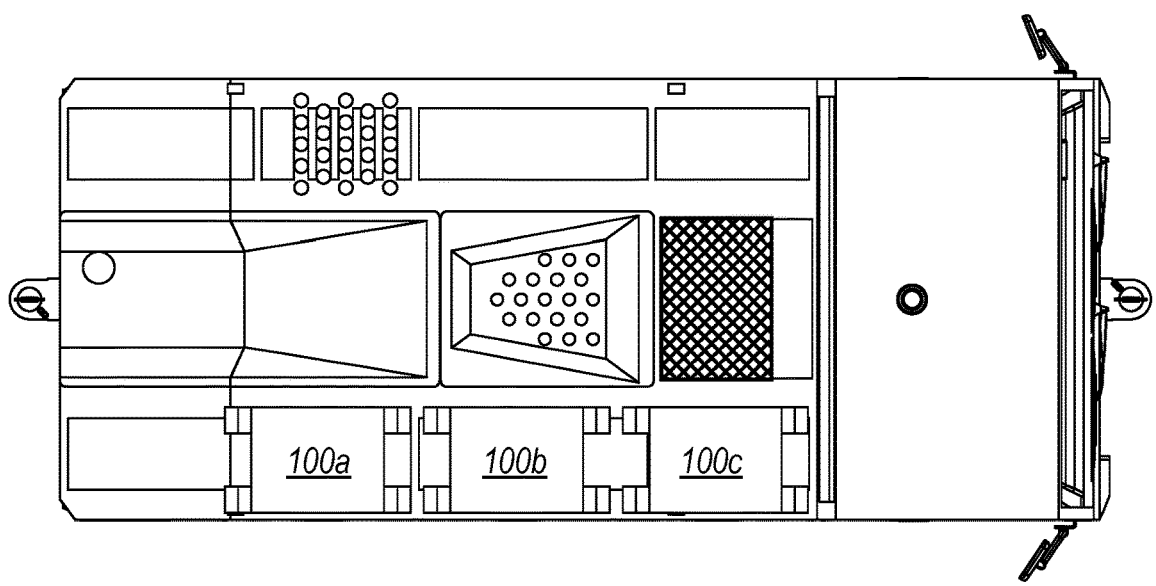

AIRCRAFT COLLISION AVOIDANCE SYSTEM

CROSS REFERENCE TO RELATED APPLICATIONS

This application is a National Stage of International Application No. PCT/IL2021/050107 filed Jan. 30, 2021, claiming priority based on Provisional Patent Application No. 62/969,761 filed Feb. 4, 2020.

FIELD OF THE INVENTION

The present invention relates to an apparatus, system and method for alerting an operator to the presence of obstacles during the towing or push-back of an aircraft while it is on the ground.

BACKGROUND OF THE INVENTION

Many collisions happen when an aircraft is being maneuvered while on the ground, for instance when being pushed-back from the gate or towed to parking location. Even if 'light' collision damage is sustained, it can typically take many weeks to repair the damage and return the aircraft to a normal flight schedule. It is clear that even such "minor" incidents cause great operational and financial damage to the airline.

In many airports, activities like push-back require that, in addition to the pushing tractor (or towing vehicle), at least one (and preferably more) operators are watching the operation in order to inform the tractor driver of any possible obstacles in real time. However, in some reported accidents, such additional watchers were either not present or did not do their job properly.

Over time, several proposals for aircraft collision avoidance based on airport infrastructure or airplane-installed systems have been proposed. However, airports can vary widely in terms of design and layout, and aircraft can also vary widely in terms of systems used and other factors. Moreover, there has not historically been a great uptake for alternative schemes for collision avoidance, and different airports typically adapt different policies regarding minimizing the risk of such collisions.

Overall, there remains a problem that the operator of a pushing tractor does not have an adequate viewpoint to spot all potential aircraft collisions, and the provision of additional observers at additional observation points has not proved an adequate solution.

Furthermore, 'wingwalker' observers are not always available, and 'tailwalking' is not even attempted. Even if observer error can be eliminated, it is at least a considerable burden and sometimes simply not possible to provide a small number of observation viewpoints which collectively have adequate coverage of all parts of a push-back manoeuvre (at least for multiple gates at an airport terminal). The present invention aims to address problems such as this in the prior art.

SUMMARY OF THE INVENTION

According to a first aspect of the present invention, there is provided an apparatus (referred to herein as a SCOUT) for alerting an operator (of the apparatus or otherwise, for example alerting anyone desired according to local policy) to the presence of obstacles during the towing or push-back of an aircraft while it is on the ground, the apparatus comprising: a self-propelled platform; at least one sensor attached to said platform, configured to sense potential obstacles; and a communication system attached to said platform for transmitting data relating to said sensed obstacles, the communication system being operable to communicate with at least one of: a same said apparatus; an operator control panel; a command centre; and a vehicle towing or pushing-back the aircraft. Optionally the communication system may be operable to communicate with (additionally, or only) the aircraft being towed or pushed-back, either to facilitate communication with a pilot or other individual on the aircraft, or via a communications relay of any appropriate type, for example forwarding communications to and from any of the entities as aforesaid. The pilot of the aircraft may for example be allowed to observe any appropriate communications from the apparatus, even if not able to command it. Any appropriate locomotion system may be used, for example using an electric or internal combustion-based engine and wheels or tracks, and the like.

The use of such an apparatus during push-back or towing operations allows different viewpoints to be taken dynamically as required, overcoming difficulties with stationary observers not having optimal viewpoints for all push-back operations in all locations. Furthermore, the use of sensors and a communication system overcomes some of the prior problems with human observers. Yet furthermore, the present system provides more useful coverage than would be achieved by the more obvious solution of adding sensors to the towing tractor itself. The present system can furthermore deal with environmental conditions in a more flexible fashion, for example because the aircraft is observed from a relatively close distance; in the case of heavy rain or fog, conventional observation methods may not even perform adequately.

The operator control panel may be a physical control panel, for example attached to or forming part of a vehicle such as a towing/push-back tractor, or may be a virtual control panel, for example provided by a mobile computing device (such as a mobile phone or other handheld device held by the operator of the towing vehicle or otherwise) or a stationary computing device (such as a computing terminal in the vicinity of the aircraft, gate and/or terminal).

The present invention also provides a more satisfactory solution compared to providing sensors on the aircraft itself; while it may seem that initially it is more elegant to provide sensors exactly where they are always needed without having to move them around, there are clear disadvantages to this approach. Firstly, it makes the electrical system within an aircraft larger and more complex. It is also undesirable to have to provide additional aircraft power for the sensors, and to add weight to the aircraft for a system only needed when the aircraft is on the ground. Yet furthermore, sensors attached permanently to an aircraft must meet aviation standards and certification, which can increase cost and difficulty in installation.

Also, as mentioned earlier, different aircraft have very different standards and designs, and it is a great burden and difficulty to adapt such a system to all aircraft. By contrast, providing sensors that have to move around to follow the aircraft initially seems counter-intuitive and undesirable, but the advantages mentioned above become apparent once the technical prejudice is overcome and the idea is considered more fully. It should also be borne in mind that the governance of the pushback procedure is in the hand of the pushback driver, not the pilot. Having a system on the aircraft requires the intervention of the pilot, which needlessly complicated the procedure and introduces extra modes of failure.

Said at least one sensor is preferably configured to sense contour edges of said aircraft. Thus it may for example be an upward-facing sensor, but may alternatively be able to sense in essentially horizontal directions in addition or alternatively. The at least one sensor preferably includes at least one of: a visual sensor (such as a conventional camera sensing visible light frequencies), an infrared camera (being a specialised form of visual sensor which senses infrared light frequencies), a LIDAR sensor, a radar sensor, and a chameleon eye-like sensor. Essentially any type of sensor which is capable of sensing contour edges of aircraft and/or potential obstacles may be used as possible and appropriate. However, the skilled person would appreciate that each sensor type mentioned above has its advantages and disadvantages, and a combination of sensors is preferably used to avoid specific weaknesses in the sensing.

The or each sensor may comprise at least one aircraft sensor, for detecting a point on the aircraft; and at least one obstacle sensor for detecting obstacles in the vicinity of the aircraft. Preferably the point on the aircraft is a point on the contour edge (for example a point on a wing or tail, or on any other protrusion from, or edge of, the aircraft fuselage). Preferably the or each aircraft sensor includes a visual sensor (daytime or night, or both) as aforesaid for allowing image object detection to be carried out. Preferably the or each obstacle sensor includes a distance sensor such as a radar or LIDAR sensor as aforesaid. Preferably separate sensors provide the separate functions of aircraft sensor and obstacle sensor. In one variant, both functions of the aircraft sensor and the obstacle sensor are embodied in a single sensor or multiple sensors (for example in the form of an optionally high resolution wide angle visual sensor).

The or each aircraft sensor is preferably operable to track the aforesaid point on the aircraft, whereby the apparatus and/or the sensor can be caused to maintain an alignment with said point on the aircraft. The term 'track' in this context preferably connotes following, locking on, or measuring or monitoring a relative displacement of a position, object or portion of an object.

The apparatus preferably further comprises a processor for processing signals received from said at least one sensor. In this case, the communication system may be configured to transmit the result of the processing by the processor. Raw or pre-processed sensor data may be transmitted, for example as a live or semi-live camera feed and the like, or a more processed version of the sensor data may be transmitted, such as a list of detected objects, a point cloud, any other set of distance measurements, and so on.

In more detail, the processor is preferably programmed to determine the presence of an obstacle in the vicinity of the aircraft, and to send an alert via the communication system when the obstacle is detected. The alert may or may not include additional sensor or other data relating to the obstacle, the position and/or orientation of the apparatus, the state or configuration of the sensor, a calculated trajectory of the obstacle, aircraft or apparatus, and so on. Equally, the same processing may be carried out at a system level, for example within a guiding carrier or other device, or at a central processing location (for example located within the airport or elsewhere at a central server, and the like). The alert sent may for example include an image, video capture/streaming of the event or either of the same inserted ("injected") into an existing image or video capture/streaming being provided in relation to the tow/push back operation.

The alert may be sent to any appropriate entity (and consequently any appropriate operator), such as a local control panel, on a GSE or other vehicle, or central control center, and so on.

The apparatus may further comprise a database of aircraft shape data, in which case the apparatus is programmed to retrieve aircraft shape data from the database corresponding to the aircraft, and to process the sensor outputs in dependence on the retrieved aircraft shape data to identify parts of the aircraft.

In one embodiment, the system is fabricated in such a way as to avoid damage to the aircraft tyre if the tyre comes into contact with the apparatus. This may be by selecting materials soft enough not to pierce the aircraft tyre rubber, and/or by fabricating the apparatus with a design that prevents harder materials being exposed if the apparatus is compressed. Preferably rigid or potentially sharp elements of the apparatus such as the sensors and sensor glass are designed to fail in a non-destructive fashion if compressed vertically, for example by causing the apparatus body to crumple or compress elastically in the vicinity of the relevant elements. This principle may be applied more broadly to any appropriate apparatus operating on the ground in the vicinity of an aircraft. This principle may also apply also to the carrier, for example.

Preferably the apparatus comprises a control system for controlling the movement of the apparatus, and for controlling any other necessary features of the apparatus as required. The control system may be operable to receive a command from the communication system to cause the apparatus to move to a defined location, for example. The movement may be via manual control, for example using commands to set, decrease or increase speed, and to turn left or right by an amount, or to head to a specified bearing, or to head to a specified relative or absolute coordinate, and so on. To assist with manual position, a visual feed or other sensed or calculated spatial data may be sent by the apparatus to a controlling entity. Alternatively, and preferably, the movement control of the device is automatic and/or objective-based, and the apparatus is programmed to move essentially autonomously to fulfil an objective transmitted to the apparatus via any appropriate means (such as a command sent via the communications system).

The defined location as aforesaid may be a defined location relative to the aircraft, whereby the apparatus is configured to be controlled by the control system (for example via a control panel, nearby or otherwise) so as to maintain the defined location relative to the aircraft. This may comprise determining (preferably autonomously) relative movements of the aircraft, and controlling movements of the apparatus to substantially match the detected movements of the aircraft (thereby maintaining a fixed position relative to it). The movements may include adjustments of the orientation of the apparatus as well as the position, although typically the sensors will not require the apparatus to maintain a particular orientation. Preferably the defined location is a location at the edge of the aircraft, such as a point along an aircraft wing.

In another mode of operation, the apparatus may be configured to be controlled by the control system to move relative to the aircraft so as to follow an edge of the aircraft. This relative movement preferably occurs regardless of whether the aircraft is stationary or moving. Thus, in this mode of operation, as an aircraft is pushed-back or towed, the apparatus can provide a continuous view around all parts of the aircraft from the best vantage point in each case.

The control system is preferably operable to disembark the apparatus from a carrier, for example prior to or at the start of a push-back or towing manoeuvre.

Likewise, the control system is preferably operable to return the apparatus to the carrier, for example on receipt of a recall command, and preferably to cause the apparatus to return to a storage position on the carrier. A number of storage positions may be provided, and the apparatus may determine an appropriate free slot autonomously, or may be commanded to return to a specified slot by a controlling entity.

The apparatus is preferably configured to receive via the communication system and to carry out at least one command selected from: move to a defined location; lock in a desired position relative to an aircraft; disembark from a carrier; embark on a carrier; sense in a defined direction; sense for a defined object; sense for a defined type of object; provide a status report; produce an audio alert, produce a visual alert; transmit an alert via the communications system (essentially transmitting any type of alert to any appropriate location as aforesaid, such as sending an image or a video signal to a local control panel or control center, for example); carry out a self-test; activate; and deactivate. Other commands and behaviours are of course possible.

The apparatus may be battery- or fuel-powered (or otherwise), and may be configured to interact automatically with a charging or refuelling device while stored.

In another aspect of the invention, there is provided an aircraft collision avoidance system for use during towing or push-back of an aircraft while it is on the ground, the system comprising: at least one apparatus as aforesaid; and a carrier configured to carry said at least one apparatus.

Preferably said carrier is self-propelled. Any appropriate locomotion system may be used, for example using an electric or internal combustion-based engine and wheels or tracks, and the like. Preferably the carrier is adopted to tow or push an airplane. It may alternatively be provided in combination with a conventional towing/pushing tractor and the like, to facilitate operation with a legacy system. The carrier may for example be attached to the rear, or any other part, of a conventional tow tractor or other vehicle. Alternatively the carrier may be fixed in place or otherwise statically provided in the vicinity of the aircraft. There may be provided one or more carriers per aircraft gate at an air terminal, for example. Alternatively, a central pool of carriers and/or apparatuses as aforesaid may be provided, dispatched to individual gates when needed.

The carrier is preferably configured to transmit at least one command to the communication system of each apparatus, at least one command selected from: move to a defined location; lock in a desired position relative to an aircraft; disembark from the carrier; embark on the carrier; sense in a defined direction; sense for a defined object; sense for a defined type of object; provide a status report; produce an audio alert, produce a visual alert; transmit an alert via the communications system; carry out a self-test; activate; and deactivate. Other commands and behaviours are of course possible. The transmission of commands may be made in response to inputs via an operator user interface, or may be instigated automatically by a control system in the carrier or elsewhere (for example in a central or other control room in the airport). In one embodiment, a central controller causes commands to be sent to and/or via multiple carriers to multiple respective apparatuses, and receives information and/or sensor data from said multiple carriers. In a related embodiment, existing systems for observing push-backs and towing of aircraft are combined with the system as aforesaid, for example allowing an operator to receive multiple sources of information to determine the safe passage of the aircraft.

The carrier may be configured to transmit commands to cause a first said apparatus to position itself in visual proximity to a first edge of said aircraft contour, and to cause an optional second said apparatus to position itself in visual proximity to a second edge of said aircraft contour. Preferably the positioning is sufficient to allow the at least one sensor to observe substantially continuously the respective edge (or point or portion as aforesaid, as appropriate), without necessarily requiring a constant spatial relationship between the apparatus and observed edge. The positioning may be substantially below the respective edge, which is to say substantially vertically aligned with the respective edge. Alternatively, the positioning may be within a threshold angle from vertical from the observed edge(s), or within a threshold distance from the horizontal position of the observed edge(s), or within a defined safety zone relative to the observed edge(s), for example incorporating any relevant features relating to a safety zone mentioned below. Optionally, visual proximity requires only visibility at any range. The at least one apparatus may be positioned such that it will maintain visual contact with the respective edge throughout a range (preferably a full range) of anticipated movement of the aircraft during the towing or push back. The carrier may be configured to transmit commands to cause the first and second apparatus to lock in position relative to said first and second edge of said aircraft respectively, such that said first and (optional) second apparatus remain in the same location relative to said first and second edge during push-back or towing of the aircraft. The carrier may be configured to transmit commands to cause at least one said apparatus to move relative to the aircraft so as to follow an edge of the aircraft.

A safety zone may be defined, in which case the system is configured to monitor for the presence of an obstacle within the safety zone. This can be carried out at the carrier, at each respective apparatus autonomously (or otherwise), or via any other appropriate means. The safety zone may be designated as (or otherwise created in dependence on) a polygon (such as a triangle) having vertices corresponding to deployed apparatuses as aforesaid.

The carrier is preferably configured to receive (and optionally to display) processed sensor data from said at least one apparatus. The carrier may be configured to receive an alert from said at least one apparatus to indicate that an obstacle is detected. The carrier may furthermore be configured to send a notification following detection of an obstacle, said notification preferably being at least one of: a sound, an image, an image of said obstacle, and a command. The carrier may be configured to cause the at least one apparatus to return to a storage position on completion of the towing or push-back of the aircraft.

It will be appreciated that in one embodiment, the system may carry a single apparatus as aforesaid. The apparatus may be assigned to a single part of the aircraft, or may be assigned to any part depending on need, either being assigned to a single part during a single operation, or possibly being assigned to multiple parts in turn during a single operation. The principle may be extended as appropriate to each apparatus in embodiments with multiple apparatuses. In another embodiment, at least two apparatuses are provided. In another case, three apparatuses may be provided, for example to provide coverage of both wings as well as the tail. Optionally four or more apparatuses may be provided, to provide additional coverage and/or redundancy. Larger numbers of apparatuses (such as five, six, seven, eight, and so on) are also possible. Multiple carriers may be provided as necessary or desired in order to transport all apparatuses to the aircraft region.

It is noted that aircraft pose a particular problem not found in other areas dealing with collision avoidance. The sheer size of an aircraft and the characteristic shape mean that it is unusually difficult to get a good viewpoint of the whole of the aircraft. The feature of providing a plurality of apparatuses as aforesaid follows from the realisation that distributing the sensors far apart in such a fashion provides a disproportionately large increase in sensing accuracy.

In another aspect of the invention, there is provided a method of alerting an operator to the presence of obstacles during the push-back or towing of the aircraft, the method comprising: providing an aircraft collision avoidance system as aforesaid; and operating the system: to bring a first apparatus to a position in visual proximity to a first edge of said aircraft contour; and to bring an optional second apparatus to a position in visual proximity to a second edge of said aircraft contour.

As before, identification of each edge may be made utilizing said at least one sensor of the respective apparatus, and the method may further comprise outputting a 'go' notification indicating that it is safe to push-back or tow the aircraft. The method may further comprise locking at least one of said first apparatus and second apparatus in position relative to said first and second edge of said aircraft respectively, such that said at least one of said first and second apparatus remain in the same location relative to said first and second edge during push-back or towing of the aircraft.

The method may further comprise defining a safety zone, and monitoring for the presence of an obstacle within the safety zone. The method may further comprise sending a notification following identification of said presence of said obstacle, said notification preferably being at least one of: a sound, an image, an image of said obstacle, and a command. Other notifications are of course possible.

Preferably at least one of said apparatuses is in communication with at least one of a towing vehicle/GSE, a communication centre and a towing vehicle operator. The towing vehicle may comprise a carrier as aforesaid, and may be the vehicle from which the or each apparatus was deployed, or otherwise. The towing vehicle is preferably a vehicle in the vicinity of the aircraft (for example within visual range and/or used for towing or pushing back the aircraft, or otherwise attached to or associated with the aircraft). Multiple towing vehicles and/or carriers may be provided, for example.

The method may further comprise returning each apparatus to a storage position upon completion of said towing or push-back of the aircraft.

In another aspect of the invention there is provided a non-transitory computer readable medium tangibly embodying computer program code which, when executed by one or more computer processors, causes the computer to carry out appropriate aspects of the method as aforesaid and/or to control the apparatus or system as aforesaid to have the necessary functionality.

Although the embodiments of the invention described herein with reference to the drawings may comprise computer-related methods or apparatus, the invention may also extend to program instructions, particularly program instructions on or in a carrier, adapted for carrying out the processes of the invention or for causing a computer to perform as the computer apparatus of the invention. Programs may be in the form of source code, object code, a code intermediate source, such as in partially compiled form, or any other form suitable for use in the implementation of the processes according to the invention. The carrier may be any entity or device capable of carrying the program instructions. The computer program code as aforesaid may be provided in any other appropriate and tangible form (such as a computer readable signal or encoded onto any general purpose or other computing device or hardware). The computer readable medium may, for example, be a CD, DVD, Blu-ray® disc, or similar, or a hard disk, solid state disk, integrated circuit, and so on.

Although various aspects and embodiments of the present invention have been described separately above, any of the aspects and features of the present invention can be used in conjunction with any other aspect, embodiment or feature where appropriate. For example apparatus features may where appropriate be interchanged with method features. References to single entities should, where appropriate, be considered generally applicable to multiple entities and vice versa. Unless otherwise stated herein, no feature described herein should be considered to be incompatible with any other, unless such a combination is clearly and inherently incompatible. Accordingly, it should generally be envisaged that each and every separate feature disclosed in the introduction, description and drawings is combinable in any appropriate way with any other unless (as noted above) explicitly or clearly incompatible.

BRIEF DESCRIPTION OF THE DRAWINGS

The invention will now be described further, by way of example, with reference to the accompanying drawings, in which:

FIGS. 6A to 6E are illustrations of the system of FIG. 5 as attached to a tow vehicle;

DETAILED DESCRIPTION OF THE PREFERRED EMBODIMENT(S)

Various embodiments of an aircraft collision system and method will now be described.

Figure 1:
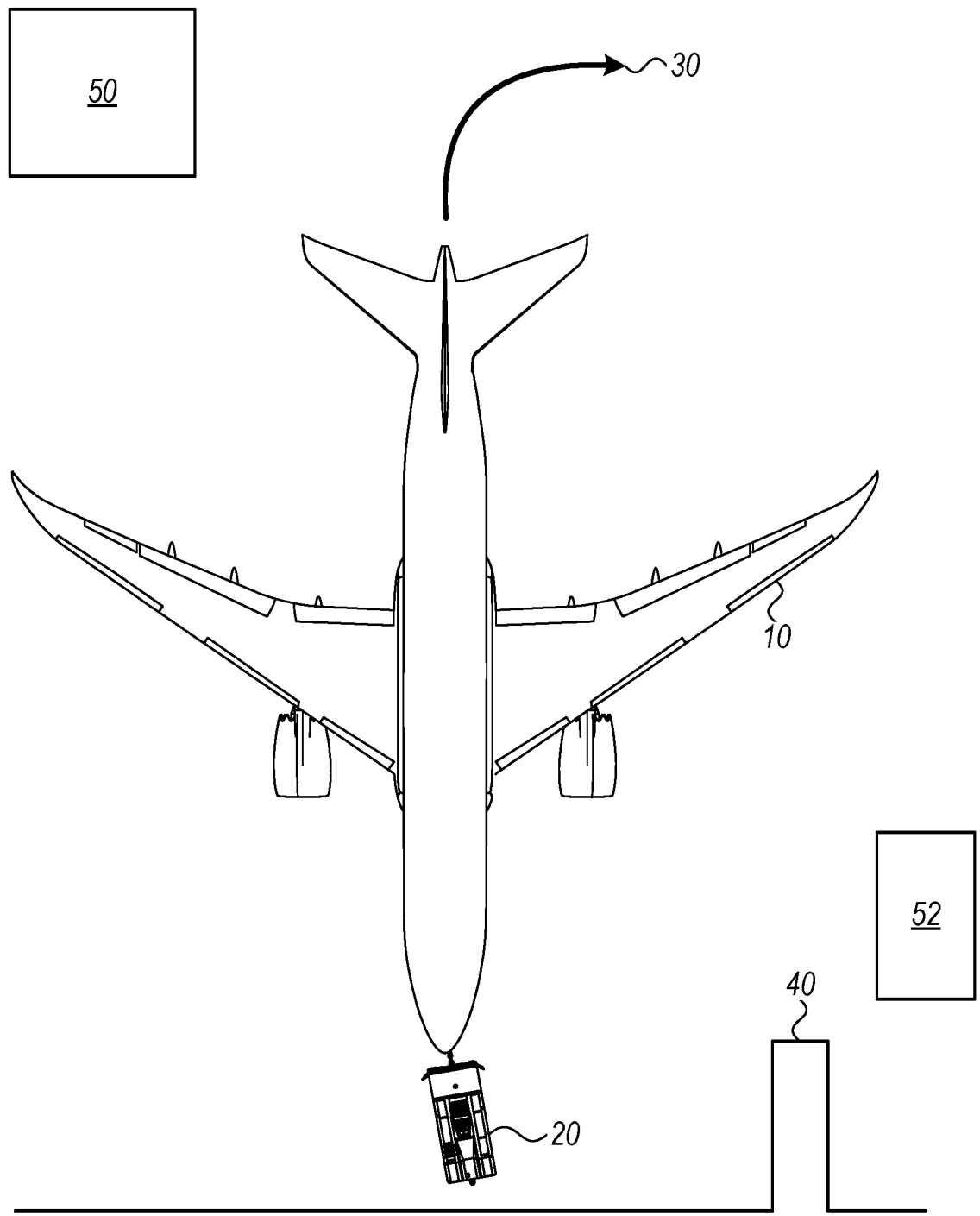
FIG. 1 is an overview of a typical push-back manoeuvre of an aircraft at an airport.

FIG. 1 is an overview of a typical push-back manoeuvre of an aircraft at an airport. An aircraft 10 is pushed back by a tow vehicle 20 along an approximate trajectory 30 away from the gate infrastructure 40. Obstacles such as buildings or other tall structures 50, 52 pose a collision risk with the aircraft.

The present aircraft collision system aims to reduce the probability of collisions between aircraft and obstacles while being pushed-back or towed on the ground, and to allow more flexibility in adapting to a specific airport and/or a variety of airplanes. The present system is not dependent on the presence of special airport or airplane infrastructure or devices. The system is known as the "Aircraft Ground Guard" or AGG, will be described below in more detail.

In a nutshell, the system is based on a self-propelled ground system (hereinafter called "SCOUT") that is equipped with appropriate sensors, communication means and logic. Typically, but not necessarily, at least two SCOUTs are required in order to accomplish effective collision avoidance, as will be explained later.

The 'SCOUT' is a self-propelled autonomous vehicle (or 'robot') that has appropriate sensors and communication means.

Figure 2:
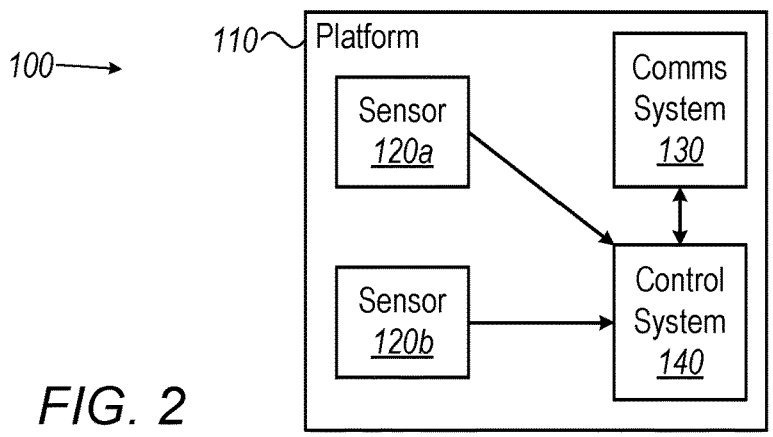
FIG. 2 is a schematic of an apparatus for assisting with avoiding collisions during the push-back or towing of an aircraft.

FIG. 2 is a schematic of an apparatus (that is, a single SCOUT unit) for assisting with avoiding collisions during the push-back or towing of an aircraft. The apparatus 100 consists of a self-propelled platform 110 including at least one sensor 120a, 120b, an optional communications system 130, and an optional control system 140 which typically includes a processor (not shown) and associate memory (not shown). A database (not shown) may also be provided, as discussed briefly below.

The communication system 130 can communicate with the driver screen (control system), and the command and control system (optional). The communication between the control system 140 and the sensor(s) 120a, 120b can be unidirectional (as illustrated) but may alternatively be bi-directional, for example if the sensors are directional and/or moveable. The platform 110 may also include a visual beacon.

Figure 3:
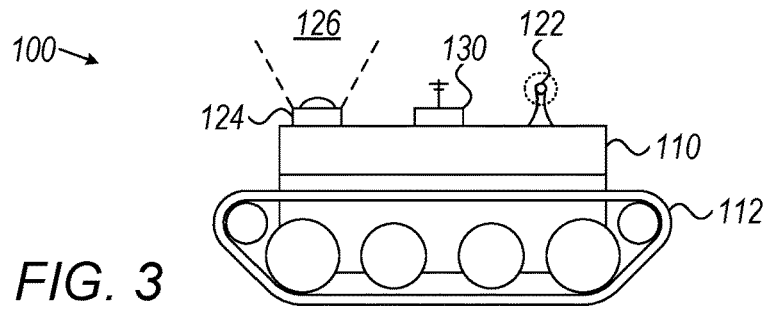
FIG. 3 is a more detailed schematic illustration of the apparatus of FIG. 2.

FIG. 3 is a more detailed schematic illustration of the apparatus of FIG. 2. The platform 110 of the SCOUT apparatus 100 includes a multi-directional propulsion system 112, and has sensors including a scanning sensor 122, at least one 'looking up' sensor 124 (and preferably several), with an approximately cone-shaped coverage 126 (though other sensor configurations are of course possible, including more horizontally arranged sensors and sensors providing closer to 360 degree coverage). The communication means 130 is also shown (in part).

Preferably the SCOUT apparatus has some or all of the following characteristics and capabilities:
1. Move in all directions, such as for example the following device: http://www.srtechnics.com/news/press-releases/2018/02/robots-driving-innovation-at-sr-technics/)(caterpillar). Other mechanisms can be used as well, such as wheeled skid-steered vehicles (e.g. U.S. Pat. No. 6,854,539), for example, and all steerable wheeled vehicles.
2. Ability to position itself at the required strategic point under the aircraft (using sensors to identify the edge of the wing or tail of the aircraft)
3. Ability to define a safe zone around the aircraft
4. Ability to identify an object entering the safety zone
5. Ability to alert Ground Support Equipment (GSE) operator
6. Ability to return to "base" when the operation is finished
7. Preferably, at least one SCOUT is employed for the AGG (and ideally at least two). In the case where more than one SCOUT is provided, preferably during Phase 1 (setup) each SCOUT seeks a different edge of the aircraft. Having two or more SCOUTs positions under the different edges of the aircraft allows for a simple and easy creation of a safety zone, for example by drawing virtual straight lines between the SCOUTs to form the border of the safety zone.

Examples of sensors that are suitable for use as the SCOUT's sensors are (1) the O3M 3D sensor system commercially available from IFM ELECTONIC GMBH Friedrichstrasse 1 45128 Essen, Germany (www.ifm.com) or (b) 4D imaging sensors commercially available from VAYYAR Ltd. 3 Avraham Giron, Yehud 5621717 Israel (vayyar.com). In one embodiment, 'chameleon eye-like' sensors are used for the SCOUT (for details, see for example the device disclosed in Proceedings of the 4th European Conference of the International Federation for Medical and Biological Engineering vol. 22 pp. 1672-1675, 2008. Other examples of sensors which can be used include PTZ cameras, FLIR blackfly S, Zed 2 stereo camera, 3D lidar Velodyne HDL-32e, and infrared cameras of various types.

The SCOUT sensors are preferably selected and configured so as to enable the following:
   Autonomous driving between the GSE (deployment vehicle) and strategic points under the aircraft (without hitting the aircraft, other equipment around the aircraft, or personnel)
   Identifying the edges of the guarded aircraft (wings or tail)
   Create a safe zone around the edges of the aircraft
   Identify objects entering the safe zone
   Work in severe weather conditions Appropriate sensors include visual sensors, Lidar (Light Detection and Ranging) sensors, Laser devices, Radar devices, Cameras, proximity sensor and the like. The sensors (with the 'assistance' of the logic in the SCOUT's processor/computer) are configured to recognize the perimeter of the aircraft, or at a minimum to recognize its extreme edges, such as the end of the aircraft wings or tail; and to explore the surrounding and the inner area (behind engines and fuselage) of the aircraft for potential obstacles. The sensors may be rigidly attached to the SCOUT, or installed on a revolving structure to allow 360 degree scanning, or on a pivot, and so on.

Preferably, the sensors of the SCOUT are capable to 'look up' (in the cone 126 of FIG. 3) in order to identify the circumference of the aircraft and in particular to identify edge points of the aircraft (such as wings and tail).

In the preferred embodiment, the SCOUT apparatus is constructed such that if it accidentally tackles an aircraft tyre, or is run over by the aircraft, it will not cause a puncture to the tyre. This is accomplished, for example, by making a substantial proportion of the structure of the SCOUT out of soft/compressible materials and covering the hard (e.g. metal) material with a protective cover, thus avoiding direct contact between the hard part of the apparatus and the aircraft tyre. Preferably gears in the device are made of plastic material such as Delrin.

Communication means allows the SCOUT to receive and send messages and commands from and to the towing vehicle/GSE operator (when there is such); to the aircraft pilot; and to a remote command and control centre.

Figure 4:
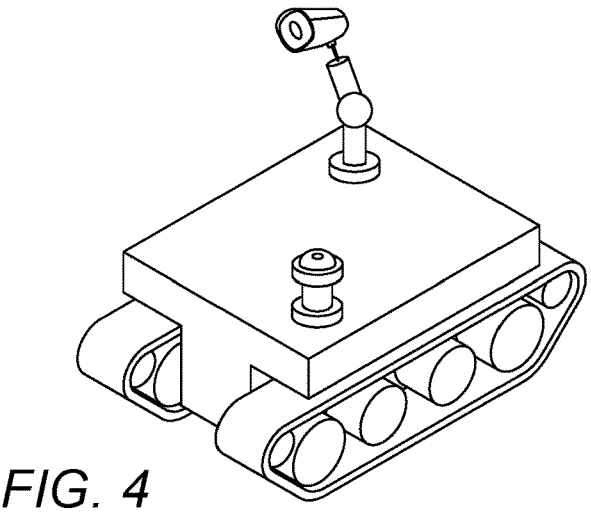
FIG. 4 is a perspective view of the apparatus of FIGS. 2 and 3.

FIG. 4 is a perspective view of the apparatus (SCOUT device) of FIGS. 2 and 3, showing one specific embodiment of the device.

Figure 5:
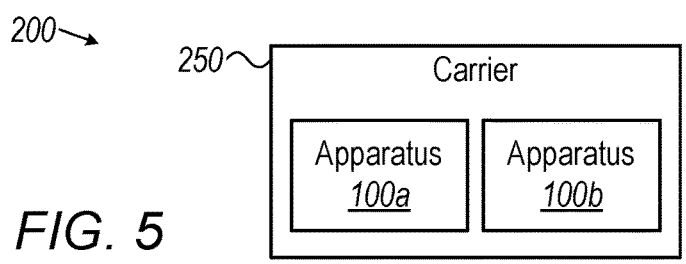
FIG. 5 is a schematic of an aircraft collision avoidance system using at least one apparatus as shown in FIGS. 2 to 4.
Figure 6A:
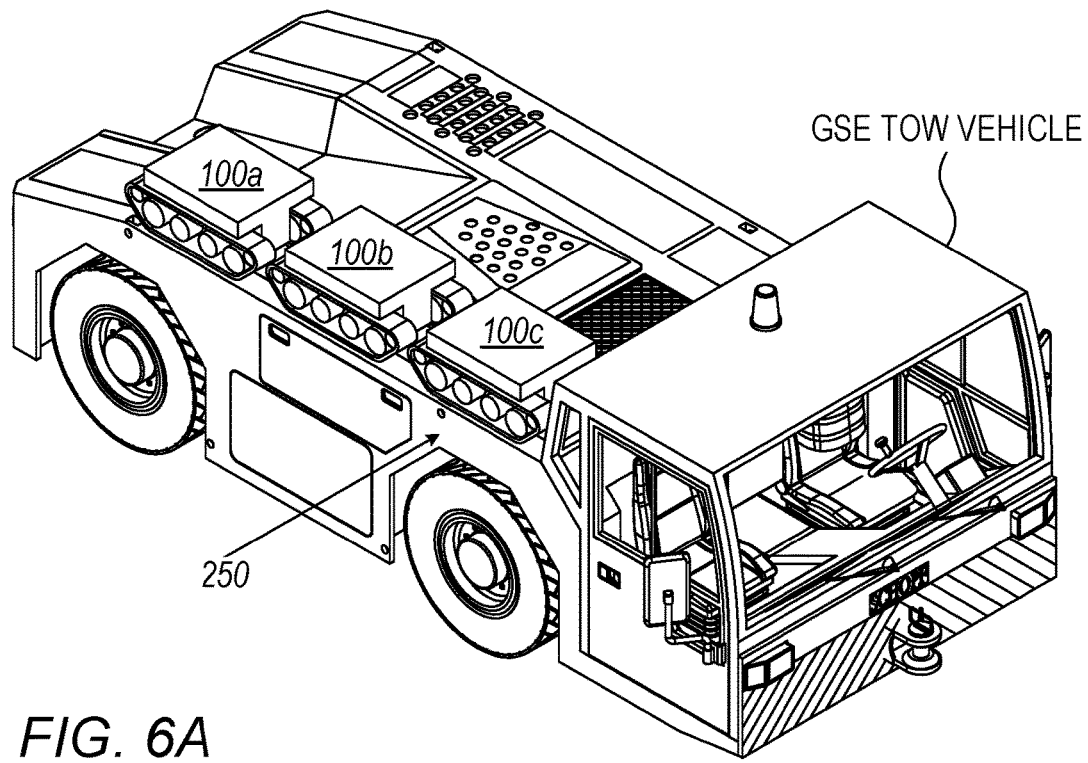
Figure 6B:
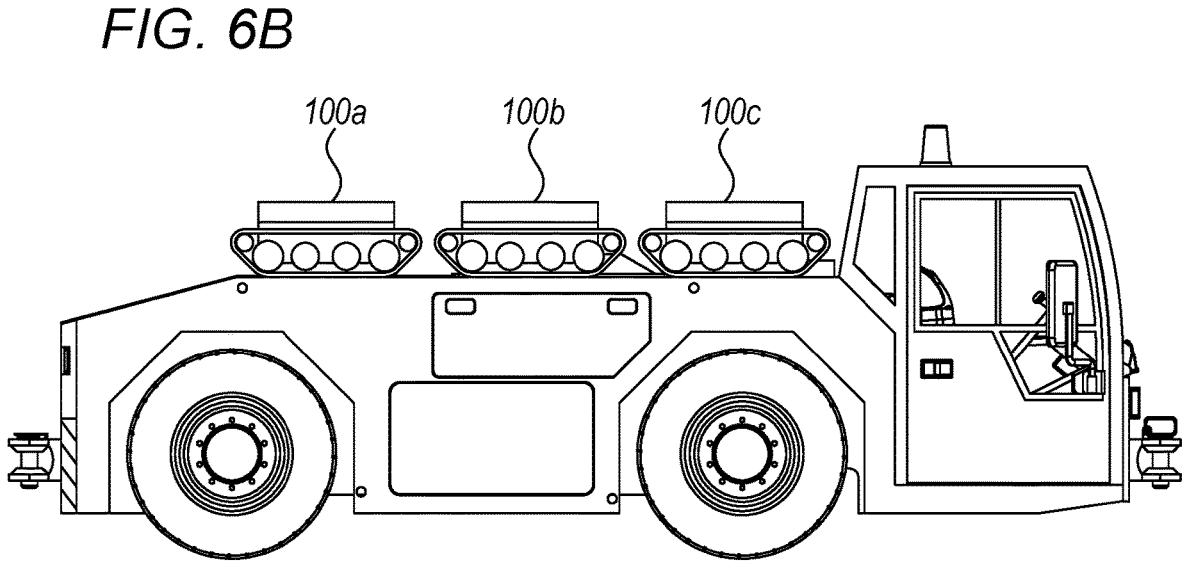
Figure 6E:
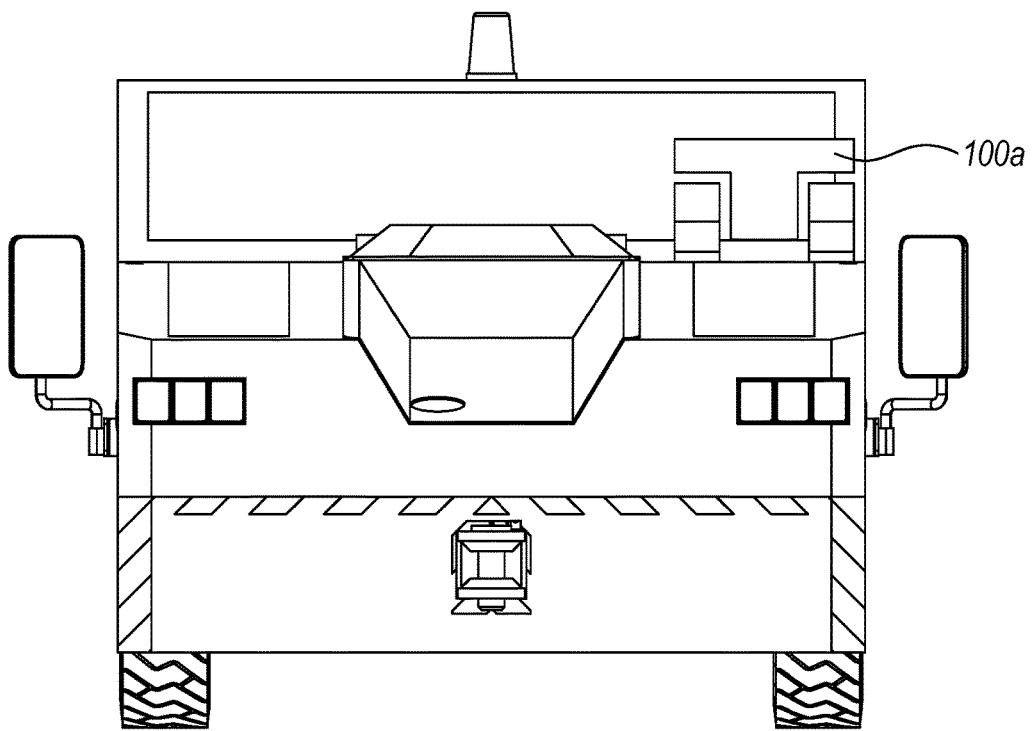

FIG. 5 is a schematic of an aircraft collision avoidance system 200 (AGG) using at least one apparatus 100 (SCOUT device) as shown in FIGS. 2 to 4. The system 200 includes a carrier 250, which can be attached to another device (such as a GSE vehicle), or can be a static stand-alone unit, or can be a stand-alone self-propelled device (and may also perform the functions of a GSE; that is, it may replace a conventional GSE). The carrier 250 in this case includes a first and second SCOUT apparatus 100*a*, 100*b*, but may include only one, or many. The apparatus may include a charging module.

FIGS. 6A to 6E are illustrations of the system of FIG. 5 in more detail, as attached to a tow vehicle (GSE). A preferred configuration of the AGG includes one GSE vehicle that carries at least two SCOUTs (but the system is workable with only one device, or more, as discussed above). FIG. 6 demonstrates an exemplary embodiment showing a GSE carrying 3 SCOUTs on top of the GSE vehicle.

Figure 7:
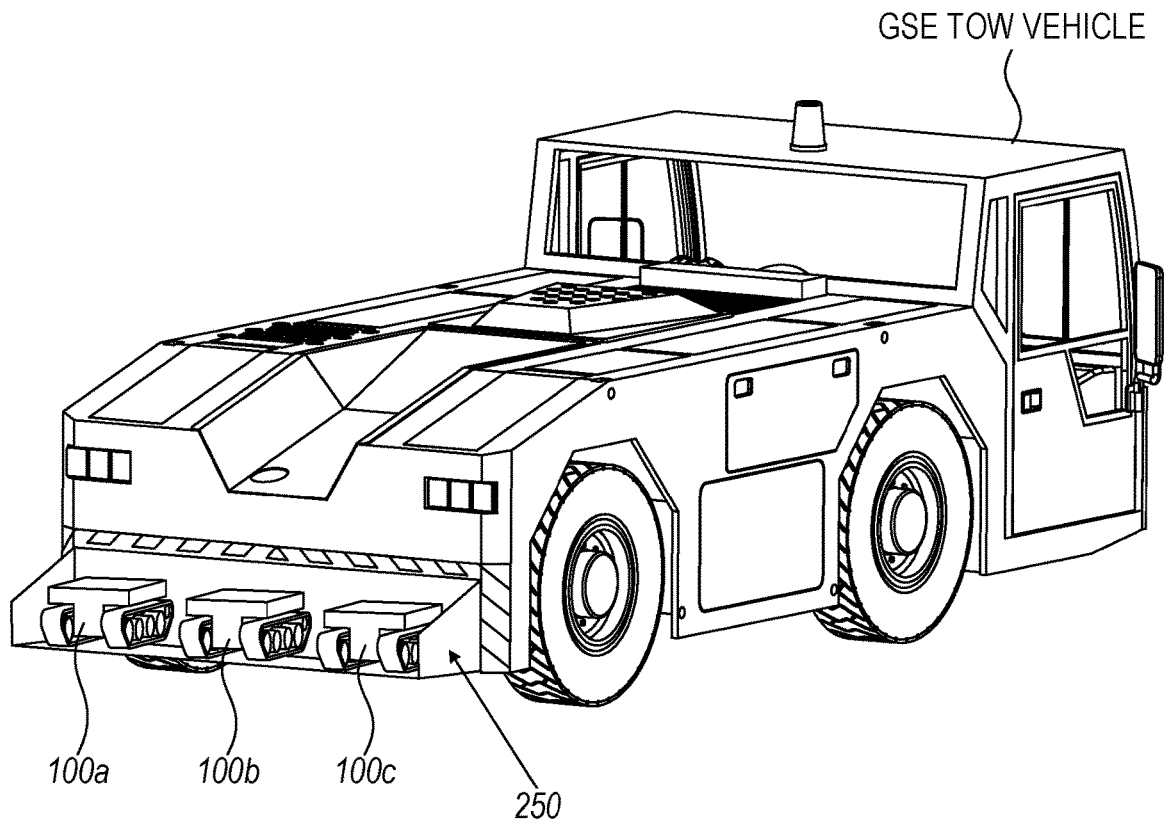
FIG. 7 is an illustration of an alternative embodiment of FIG. 5 as attached to a tow vehicle.

FIG. 7 is an illustration of an alternative embodiment of FIG. 5 as attached to a tow vehicle. In this example, the SCOUT units are carried on the rear of the vehicle, to keep them more out of the way and to keep them closer to the ground for ease of deployment. In a further embodiment (not shown), the SCOUT units and carrier are disposed on the side of the vehicle. Other arrangements, and combinations thereof, are of course possible. SCOUTs may also be carried by multiple carriers and/or on multiple GSE vehicles.

A typical and non-limiting scenario will now be described with reference to one SCOUT, but it will be appreciated that the task can be divided between two or more SCOUTS working as a work group.

In a first phase (Phase 1—'SETUP'), at least one SCOUT is brought to the proximity of the aircraft that is to be maneuvered in the airport (for example, to push-back). The SCOUT uses its sensors to identify or 'image' the perimeter of the aircraft and create a virtual safety zone, according to pre-set parameters. The SCOUT may be equipped or connected to a database of aircraft data. In such case, identifying the location of a few points in the aircraft (for instance the edge of the wings) will provide the SCOUT enough information to 'draw' the safety zone perimeter of the aircraft.

The SCOUT also scans the surroundings of the aircraft to identify potential obstacles as well as the areas behind the engines within the perimeter of the aircraft. The SCOUT may be doing the above activity while being in the same place ('locked' position) or during movement (for example, going around the aircraft in a way that resembles a sheep dog). Once this operation is finished—a 'go' is given to the tow tractor driver and/or the communication/command centre to start push back.

In a second phase (Phase 2—"ON THE MOVE") during push back, the SCOUT continues its activity in a manner similar to that undertaken in the first phase except that it is now done 'on the fly'. During this phase the SCOUT keeps a "safe zone" around the aircraft, and if this zone is breached it will immediately notify all relevant stakeholders and preferably keeps record of each "event" (for example using the same or preferably a different database to that used for the aircraft shape data. The event database should preferably also be stored in the control center). A SCOUT in 'locked' position will follow the airplane while staying at the same location relative to the airplane as set during Phase 1.

In a third phase (Phase 3—"END OF MISSION"), once the aircraft comes into position, following a notification from the tow truck driver and/or from a communication centre, the SCOUT drives itself away from the aircraft either to a location where it will not interfere with the aircraft's planned movement; to its next 'mission' (the next airplane); or to a storage location (on or off the pushback/tow truck/ ground support equipment [GSE], as is shown in FIGS. 6A to 6E).

In the preferred embodiment, the GSE in charge of towing/pushing of the aircraft will carry the SCOUTs to and from the mission area. In a different embodiment, a separate carrier vehicle carries several 'satellite' SCOUTS to the location of the aircraft.

To use multiple SCOUTs, the main elements are essentially the same as in the description above. Preferably at least two SCOUTs are employed for the AGG. In such case, preferably during Phase 1, each one of the SCOUTs seeks a different edge of the aircraft. Each of the SCOUTs can be brought (or driven/pushed) from their carrier while being guided by an operator, or optionally move autonomously from their storage (such as the SCOUT carrier on a GSE) to the desired location. Having two or more SCOUTs positions under the different edges of the aircraft allows for simple and easy creation of a safety zone. The definition of the safety zone (also referred to here as virtual safety zone) can be defined for instance by drawing virtual straight lines among the SCOUTs to form the border of the safety zone; by using a database of airplane perimeters to draw a more 'accurate' safety zone; and/or by complying with the local airport definition of required distances from obstacles. When defining the safety zone, the physical environment where maneuvering should take place is determined (for example the distance between airport gates, and the planned route). The virtual safety zone can also be dynamic and change while the aircraft is being maneuvered.

In the normal/preferred mode of operation, once in place, each one of the SCOUTs 'locks' its position relative to the edge of the aircraft and sends a 'go' to the operator/command-control centre. From that point on, until the end of the task, the SCOUT moves in order to stay in 'locked position' while looking around for obstacles. In an alternative mode of operation, as discussed above, the SCOUTs can process around the aircraft as it moves (or otherwise), to improve the coverage of the sensors.

In this present embodiment, SCOUTs may send individual 'go' signals to the controller, but the controller will not send a 'go' signal to the towing operator unless all SCOUTs have sent the 'go' signal. If any SCOUT loses position (or experiences any other error or alert condition), it sends a message indicating that it is not in a 'go' state, and that is propagated in turn to the operator.

In the present embodiment, there are two levels of control: (i) a local control group (referred to as a 'team' of SCOUTS) operated by a local controller (typically in the form of a single control panel, though multiple control panels are possible), comprising all of the SCOUTS that are assigned (dynamically or statically as appropriate) to an aircraft being pushed back; and (ii) a global control group (referred to as a 'control center') that is able to monitor several 'teams' being active in the airport. Typically the control center defers control of the SCOUTS to the local controllers/control groups, but is able to take control if needed.

The assignment of SCOUTS to an aircraft can be dynamic or static, and can be carried out locally by the local controller, or globally, by the global controller. In a smaller system, the global controller may not be provided, and the assignment is carried out locally (if dynamic) or not at all (if static). In a larger system, the assignment is typically carried out by the global controller, for example to manage a resource of SCOUTS that may be smaller in number than the number of SCOUTS required for all gates in total, and thus require careful dynamic management to match supply with demand.

Thus, ordinarily a local controller (in the form of a control panel, which may be attached to or part of a GSE vehicle, provided as an app in a phone or other mobile or fixed computing device, or any other vehicle or fixed or mobile entity) will coordinate the 'go' signals, and will optionally communicate with the global controller (if present) either to inform of the current status, or to seek confirmation of the current status, and so on. In some variants, the global controller (in the form of a control centre) will coordinate the 'go' signals to and from the individual SCOUTS.

Some of the requirements in location at the edge of the aircraft (end of wing or end of tail) are (in a preferred embodiment, though in variants, the use of sensors may differ):

1. The SCOUT will identify the end of the wing by an optic sensor/radar sensor.

2. Optionally the SCOUT analyzes the contour of the aircraft and processes the sensor data in accordance with an algorithm to identify the end of the wing/tail in relation to the aircraft.

3. Optionally, the SCOUT differentiates between right and left wing and drives to the correct wing according to its role in the system. The role may be statically assigned, or dynamically assigned during the operation.

4. The SCOUT uses location data, sensor data and/or commands from a controller to differentiate between the aircraft that needs to be guarded and other aircrafts in the vicinity of the guarded aircraft.

5. The SCOUT may use pre-defined database of aircraft to identify the end of the wing/tail.

Figure 8:
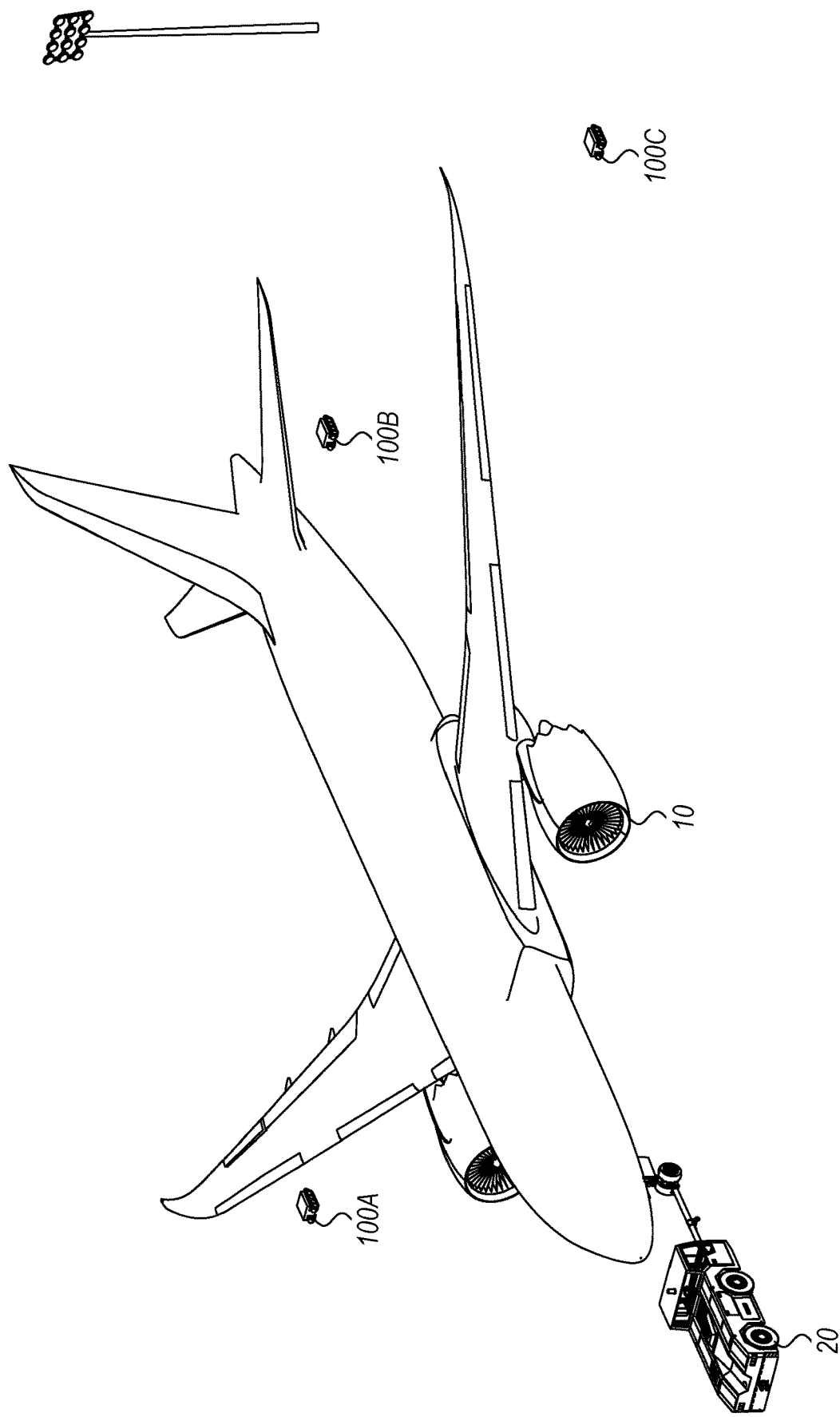
FIG. 8 is an illustration of the system of FIGS. 5 and 6A to 6E in use with an aircraft.

FIG. 8 is an illustration of the system of FIGS. 5 and 6A to 6E in use with an aircraft. In this figure, 3 SCOUTs 100a, 100b, 100c are shown arranged relative to the edges of the aircraft 10. The GSE 20 is also shown.

During Phase 2 (e.g. during push back), all SCOUTs remain in position relative to the edges in the airplane (which means that they are moving when the plane is moving), while 'watching' using their sensors whether there is any obstacle (static or moving) within the safety zone created in Phase 2. If an obstacle is identified, an alert is sent (or a stop order) preferably to all pre-defined stakeholders. Optionally, at least one of the SCOUTs is equipped with a video camera filming the surrounding and broadcasting it to the operator or control centre (this option, is of course feasible also for a single SCOUT). Stakeholders may include, but are not limited to: a control centre; the aircraft's pilot (or other personnel in the cockpit); and the GSE driver. An alert may also be sent by an SMS, e-mail communication, sounding an alarm or illumination of a beacon on the GSE and/or the SCOUT, and so on.

In Phase 3, using two or more SCOUTs follows essentially the same process as described above for one SCOUT.

Figure 9:
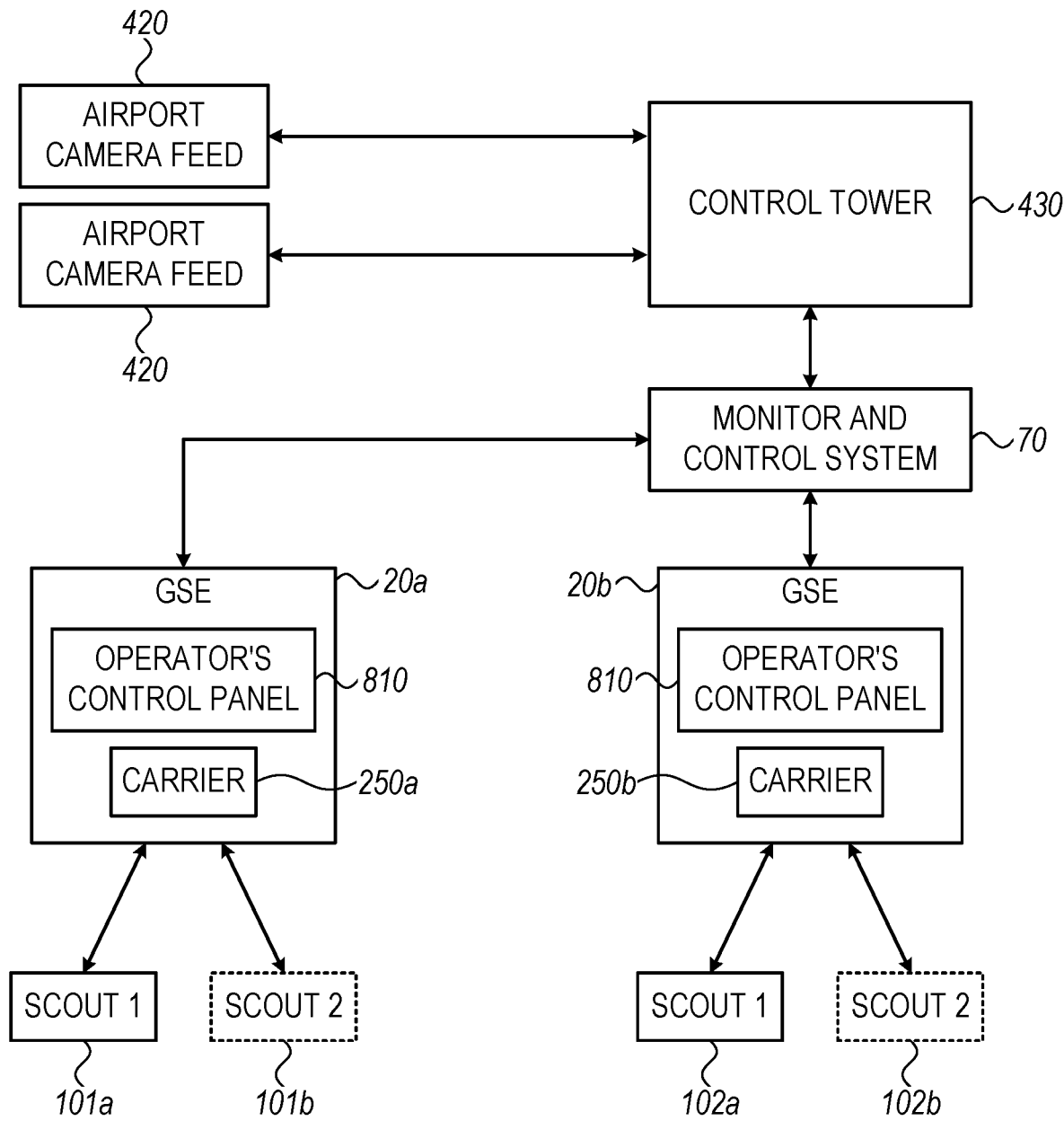
FIG. 9 is a diagram illustrating a centralised version of the system of FIGS. 5, 6A to 6E and 8.

FIG. 9 is a diagram illustrating a centralised version of the system of FIGS. 5, 6A to 6E and 8. Here, a plurality of GSEs 20a, 20b each has a Operator's control panel 810 and carrier devices 250a, 250b respectively are shown monitored and optionally controlled by a single Monitor and Control centre 70, which may in turn be in communication with the control tower 430 or other airport system coordinating the push-back of aircraft from gates, and optionally camera feeds 420 and the like from airport cameras, allowing an overview of the general situation as well as an alternative view of individual push-back operations. SCOUTs 101a, 101b, 102a, 102b are preferably controlled via Operator's Control Panel 810 and optionally directly by Monitor and Control System 70. It is possible to combine the present system with previous manual observation processes, for example, though it is envisaged that this is not necessary.

Figure 10:
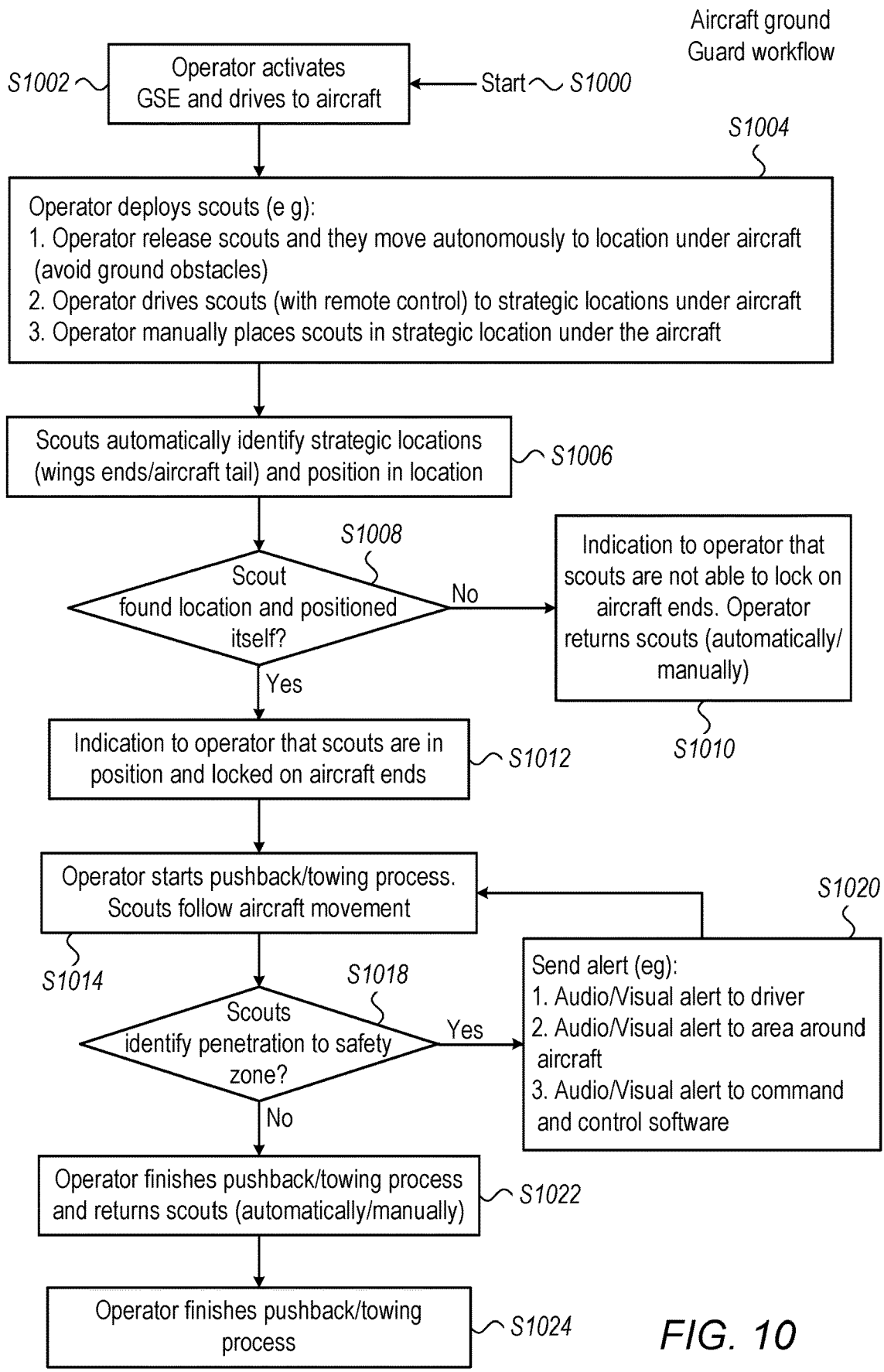
FIG. 10 is a flowchart illustrating the operation of the system of FIGS. 5, 6A to 6E and 8.

FIG. 10 is a flowchart illustrating the main elements of a typical operation of the system of FIGS. 5, 6A to 6E and 8 in more detail.

Step 1000 marks the starting of the operation of the AGG system. Typically, it is an instruction to the GSE driver to push back a certain aircraft.

In Step 1002 Operator activates the GSE and drives it to the proximity of the aircraft In Step 1004 Operator deploys SCOUT(s). Several modes are depicted:

The operator releases the scouts from their parking location (in the airport or on the carrying vehicle) so they move autonomously to strategic location under the aircraft, while avoiding ground obstacles on their way. Strategic location as referred herein means location under the aircraft for performing SCOUT 'mission' as detailed above—typically—wing ends/aircraft tail.

The operator drives each SCOUT using a remote control to a strategic location under the aircraft.

The operator manually places each SCOUT in strategic locations under the aircraft.

Connecting the GSE to the aircraft in order to allow towing/push back can be done before step S1004 or after performing step S1004 or during step S1014 as described below.

In step S1006 each SCOUT position (or 'locks') itself in the precise strategic position Step 1008 is a check point for verifying whether SCOUT have found the precise strategic position and 'locked' its location.

If it is indicated that SCOUT was not successful in locking itself in position in Step S1010 an indication is sent to operator that SCOUT(s) is/are unable to lock on aircraft ends. In such case operator may perform a correcting action (try to position in strategic position and check lock again) or return SCOUTs (automatically/manually) to starting point.

If 'lock' was achieved—in Step S1012 an indication to operator that SCOUTS are in positions and locked on aircraft ends is sent.

In step 1014 Operator starts push back/towing process (if it was not done yet, connects the GSE to the aircraft in order to allow push back/towing).

Push back/towing is ongoing with the SCOUTs monitoring as explained above. If at step S1018 any of the SCOUTs identifies a 'threatening' obstacle or any penetration into safety zone the following is done in step S1020:

In Step 1020, triggered by an identification of penetration to the safety zone by any one of the SCOUTS at least one of the following is done: (i) audio/visual alert to the driver of the GSE (ii) Audio/visual alert to area around aircraft (e.g. siren sound, revolving yellow light) (iii) Audio/Visual alert to command and control software. In response to any of these alerts operator must stop push-back/towing and inspect the surroundings in order to define (alone or with the assistance of airport personnel) the proper way to handle the event. It should be stressed that during this time, the SCOUT system preferably continues to monitor the area for (additional) safety threats. When the alert situation is cleared, the towing process restarts at step S1014 (or at any other appropriate step).

If no alert was sent in step S1018 and then in step S1022 push back/towing process is completed by operator (i.e aircraft arrives at the desired location/position) and operator retunes SCOUTs to their parking position (on the carrying vehicle or in the airport as explained previously).

In step S1024 operator disconnects GSE from aircraft and terminates push-back/towing process.

It will be appreciated that a range of commands may be received by the SCOUT unit and acted upon in a predefined fashion. Commands that may be acted on may include (but are not limited to): move to a defined location; lock in a desired position relative to an aircraft; disembark from a carrier; embark on a carrier; sense in a defined direction; sense for a defined object; sense for a defined type of object; provide a status report; produce an audio alert, produce a visual alert; transmit an alert via the communications system; carry out a self-test; activate; and deactivate.

As described above, the system is able to function usefully with only one SCOUT apparatus. However, it will be appreciated that an aircraft is relatively large compared to a GSE vehicle or SCOUT unit, and has a shape that makes it difficult to monitor potential obstacles from a single viewpoint, or even a plurality of viewpoints that are static. It will be appreciated that the problems of avoiding collisions when pushing-back or towing an aircraft on the ground are quite unique to that environment. The provision of multiple SCOUT apparatuses and the movement of a SCOUT apparatus around the perimeter of an aircraft while it is itself in motion are two (potentially complementary) solutions that were found to provide a surprising improvement to collision detection in this environment.

In more general terms, and to be taken as not overriding or contradicting anything stated above, in a further embodiment there is provided an aircraft collision avoidance system for use during towing or push-back of an aircraft while on the ground comprising: a self-propelled platform; at least one sensor attached to said platform, configured to sense potential obstacles; a communication system attached to said platform for communication with at least one of a command center, the aircraft being towed of pushed back and a vehicle towing or pushing the aircraft. At least one sensor may be configured to sense contour edges of said aircraft. The system may further comprise a processor for processing signals received from said at least one sensor. Said at least one sensor may be a visual sensor, and/or a LIDAR sensor and/or a Radar sensor, and/or a chameleon eye like sensor. The system may further comprise a computerized data base. The system may be configured to avoid damage to the aircraft tyre.

In a further generalised embodiment there is provided an aircraft collision avoidance system for use during towing or push-back of an aircraft while on the ground comprising: at least two SCOUTs; a carrier configured to carry said at least one SCOUT; wherein said at least one SCOUT comprises: a self-propelled platform; at least one sensor attached to said platform, configured to sense potential obstacles; a communication system attached to said platform for communication with at least one of a command center, the aircraft being towed of pushed back, a vehicle towing or pushing the aircraft and said aircraft collision avoidance system. Said carrier may be self-propelled. Said carrier is adopted to tow or push an airplane. Said at least one sensor may be configured to sense contour edges of said aircraft. The system may further comprise a processor for processing signals received from said at least one sensor. Said at least one sensor may be a visual sensor, and/or a LIDAR sensor and/or a Radar sensor, and/or a chameleon eye like sensor. The system may further comprise a computerized data base. The system may be configured to avoid damage to the aircraft tyre.

In another generalised embodiment there is provided a method of reducing risk of an aircraft collision with an obstacle during push back or towing, the method comprising providing a system according to either of the two preceding embodiments, and bringing at a first SCOUT to a position below a first edge of said aircraft contour. The method may further comprise bringing a second SCOUT to a position below a second edge of said aircraft contour. Identification of said first edge may be made utilizing said at least one sensor or first SCOUT. Identification of said first edge and second edge may be made utilizing said at least one sensor or first SCOUT and at least one sensor of said second SCOUT respectively. The method may further comprise providing a "go" notification. The method may further comprise locking at least one of said first SCOUT and second SCOUT in position relative to said first and second edge of said aircraft respectively. The method may comprise defining a safety zone. At least one of first SCOUT and second SCOUT may stay in said respective locked position during push back or towing of said aircraft. At least one of said first SCOUT and second SCOUT may monitor for presence of an obstacle within said safety zone. The method may further comprise sending a notification following identification of said presence of said obstacle. Said notification may be at least one of a sound, an image, an image of said obstacle and a command. At least one of said SCOUTs may be in communication with at least one of a towing vehicle/GSE, a communication center and a towing vehicle driver. The method may further comprise returning each one of said SCOUTs to a storage position upon completion of said towing or push-back of aircraft.

Other appropriate permutations of these embodiments, for example combining features of these embodiments with features of any other, are of course possible. It will be appreciated that further modifications may be made to the invention, where appropriate, within the spirit and scope of the claims.

The invention claimed is:

1. An apparatus for alerting an operator to the presence of obstacles during the towing or push-back of an aircraft by a towing vehicle while the aircraft is on the ground, the apparatus comprising:
   a self-propelled autonomous vehicle including a platform;
   at least one sensor attached to said platform, configured to sense potential obstacles, and including at least one aircraft sensor that is operable to track a point on the aircraft; and
   a communication system attached to said platform for transmitting data relating to the sensed potential obstacles, the communication system being operable to communicate with at least one of: a same said apparatus; an operator control panel; a command centre; and the vehicle towing or pushing-back the aircraft,
   wherein the apparatus is configured to maintain an alignment of the platform with said point on the aircraft.

2. The Apparatus according to claim 1, wherein said at least one sensor is configured to sense contour edges of said aircraft.

3. The apparatus according to claim 1, wherein said at least one sensor comprises:
   at least one obstacle sensor for detecting obstacles in the vicinity of the aircraft.

4. The apparatus according to claim 1, wherein said at least one sensor includes at least one of: a visual sensor, an infrared camera, a LIDAR sensor, a radar sensor, and a chameleon eye-like sensor.

5. The apparatus according to claim 1, further comprising a processor for processing signals received from said at least one sensor, wherein the processor is programmed to determine the presence of an obstacle in the vicinity of the aircraft, and to send an alert via the communication system when the obstacle is detected.

6. The apparatus according to claim 5, further comprising a database of aircraft shape data, and wherein the apparatus is programmed to retrieve aircraft shape data from the database corresponding to the aircraft, and to process the sensor outputs in dependence on the retrieved aircraft shape data to identify parts of the aircraft.

7. The apparatus according to claim 1, wherein said apparatus is fabricated in such a way as to avoid damage to the aircraft tire if the tire comes into contact with the apparatus.

8. The apparatus according to claim 1, further comprising a control system for controlling the movement of the apparatus, wherein the control system is operable to receive a command from the communication system to cause the apparatus to move to a defined location.

9. The apparatus according to claim 8, wherein the defined location is a defined location relative to the aircraft, and the apparatus is configured to be controlled by the control system so as to maintain the defined location relative to the aircraft.

10. The apparatus according to claim 8, wherein the apparatus is configured to be controlled by the control system to move relative to the aircraft so as to follow an edge of the aircraft.

11. The apparatus according to claim 8, wherein the control system is operable to carry out at least one of: disembark the apparatus from a carrier, and return the apparatus to the carrier.

12. The apparatus according to claim 1, wherein the communication system is configured to receive at least one command selected from: move to a defined location; lock in a desired position relative to an aircraft; disembark from a carrier; embark on a carrier; sense in a defined direction; sense for a defined object; sense for a defined type of object; provide a status report; produce an audio alert, produce a visual alert; transmit an alert via the communications system; carry out a self-test; activate; and deactivate.

13. An aircraft collision avoidance system for use during towing or push-back of an aircraft by a towing vehicle while the aircraft is on the ground, the system comprising:
at least one apparatus for alerting an operator to the presence of obstacles during the towing or push-back of an aircraft while it is on the ground, the apparatus comprising:
 a self-propelled autonomous vehicle including a platform;
 at least one sensor attached to said platform, configured to sense potential obstacles, and including at least one aircraft sensor that is operable to track a point on the aircraft; and
 a communication system attached to said platform for transmitting data relating to said sensed obstacles, the communication system being operable to communicate with at least one of: a same said apparatus; an operator control panel; a command centre; and the towing vehicle towing or pushing-back the aircraft, wherein the apparatus is configured to maintain an alignment of the platform with said point on the aircraft; and
a carrier configured to carry said at least one apparatus.

14. The system according to claim 13, wherein said carrier is configured to transmit commands to cause a first said apparatus to position itself in visual proximity to a first edge of said aircraft contour, and optionally to cause a second said apparatus to position itself in visual proximity to a second edge of said aircraft contour.

15. The system according to claim 14, wherein said carrier is configured to transmit commands to cause the first and optionally second apparatus to lock in position relative to said first and second edge of said aircraft respectively, such that said first and optional second apparatus remain in the same location relative to said first and second edge during push-back or towing of the aircraft.

16. The system according to claim 13, wherein a safety zone is defined, and the system is configured to monitor for the presence of an obstacle within the safety zone.

17. The system according to claim 13, wherein said carrier is configured to receive processed sensor data from said at least one apparatus.

18. The system according to claim 13, wherein said carrier is configured to receive an alert from said at least one apparatus to indicate that an obstacle is detected.

19. The method according to claim 15, further comprising outputting a 'go' notification indicating that it is safe to push-back or tow the aircraft.

20. The method according to claim 15, further comprising locking at least one said apparatus in position relative to an edge of said aircraft, such that said at least one said apparatus remains in the same location relative to said edge during push-back or towing of the aircraft.

21. The method according to claim 15, further comprising defining a safety zone, and monitoring for the presence of an obstacle within the safety zone.

22. The method according to claim 15, wherein at least one said apparatus is in communication with at least one of a towing vehicle/GSE, a communication centre and a towing vehicle operator.

23. A method of alerting an operator to the presence of obstacles during the push-back or towing of an aircraft by a towing vehicle, the method comprising:
providing at least one self-propelled autonomous apparatus including a platform and at least one sensor attached to said platform, said at least one sensor being configured to sense potential obstacles, and including at least one aircraft sensor that is operable to track a point on said aircraft;
bringing at least one said apparatus to a position within visual range of a respective part of said aircraft; and
causing said at least one said apparatus to maintain its position relative to the respective said point on said aircraft during a movement of said aircraft by the towing vehicle.

* * * * *